Figure 1:
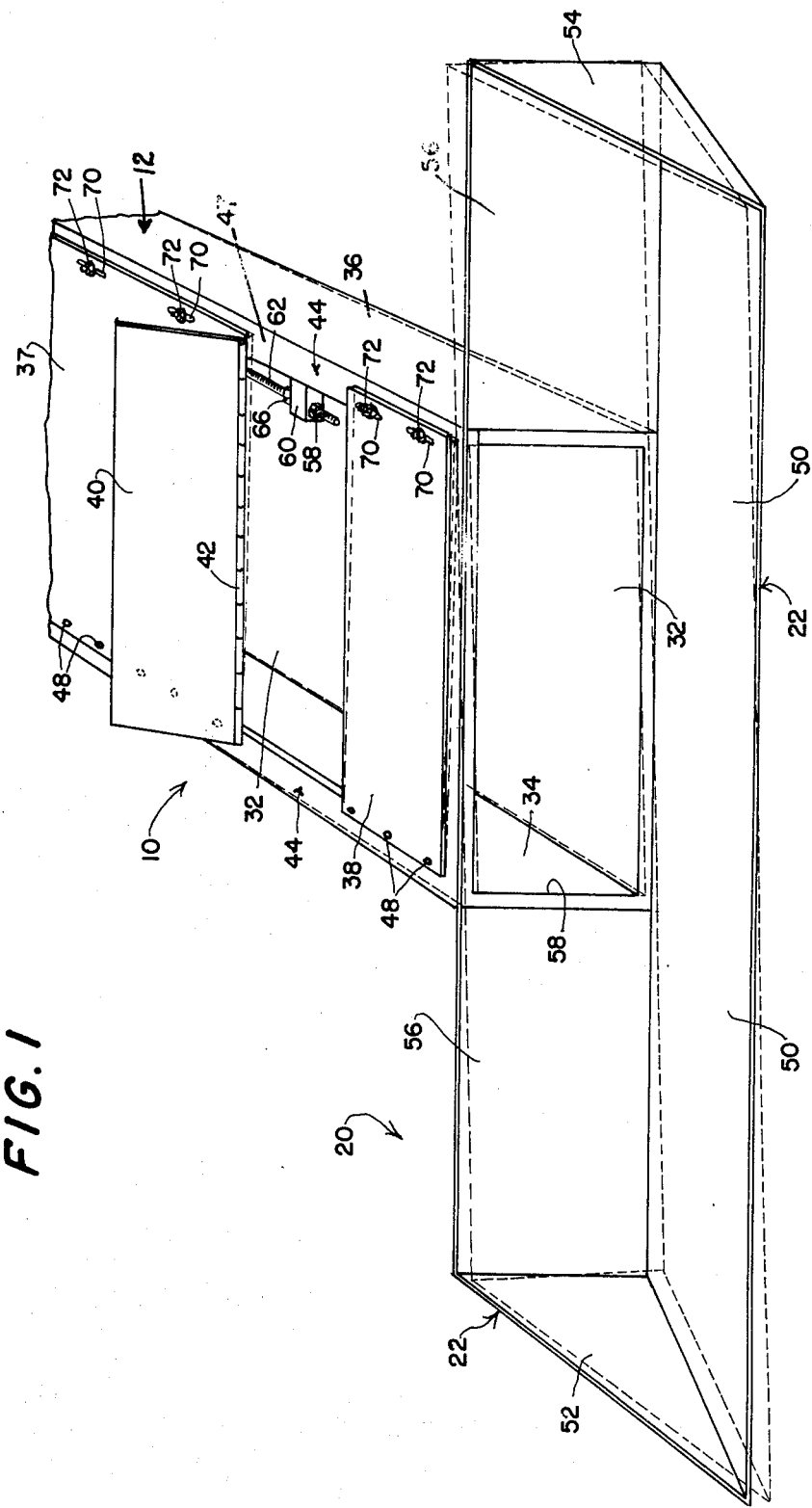

United States Patent [19]
Kerber et al.

[11] B 3,981,125
[45] Sept. 21, 1976

[54] LEVELING MECHANISM FOR HARVESTER HEADERS

[75] Inventors: Dathan R. Kerber, Bettendorf, Iowa; Thomas A. Hocking, Colona; John L. Vande Wiele, Moline, both of Ill.

[73] Assignee: International Harvester Company, Chicago, Ill.

[22] Filed: Feb. 12, 1975

[21] Appl. No.: 549,244

[44] Published under the second Trial Voluntary Protest Program on January 27, 1976 as document No. B 549,244.

[52] U.S. Cl. ................................. 56/14.5; 56/208
[51] Int. Cl.² ..................................... A01D 41/04
[58] Field of Search ............ 56/14.5, 14.6, DIG. 10, 56/219, 208, 124

[56] References Cited
UNITED STATES PATENTS
3,537,243   11/1970   Bichel .................................. 56/14.6

Primary Examiner—Hugh R. Chamblee
Assistant Examiner—J. N. Eskovitz
Attorney, Agent, or Firm—F. David AuBuchon; Floyd B. Harman

[57] ABSTRACT

A leveling mechanism for harvester platforms or headers which is predicated upon the fact that a slight forcible distortion of the feeder housing to which the platform is secured will, when the distortion is effected in a particular manner, result in a side-to-side rocking motion of the platform. The mechanism for effecting such distortion is disposed immediately beneath the usual access door in the top wall of the feeder housing where it is readily accessible for manipulation, and locking means are provided for releasably securing the feeder housing in any of the distorted conditions of which it is capable of assuming.

8 Claims, 3 Drawing Figures

LEVELING MECHANISM FOR HARVESTER HEADERS

The present invention relates to a leveling means for the header or platform which is associated with the feeder of a harvesting combine and has particular reference to a novel leveling mechanism by means of which a slight forcible distortion of the feeder housing will effect a change in the attitude of the feeder.

It is a demonstrable fact that if an elongated flexible tubular body which is rectangular in cross section is slit longitudinally along the junction line between its horizontal top wall and one vertical side wall, and if the free edge of the top wall is forcibly slid longitudinally along the free edge of the adjacent vertical side wall in one direction, one vertical edge of the body at one end thereof is placed under compression while the other vertical edge of the body at such end is placed under tension. The resultant distortion of the body causes the horizontal edge of the bottom wall to become inclined in a transverse direction to a marked degree, the compression of one side wall tending to force the bottom wall downwardly and the tension of the other side wall tending to pull the bottom wall upwardly. At the other end of the body, a reverse phenomena takes place, the tension and compression in the side walls being reversed so that the bottom wall becomes oppositely inclined. Under such circumstances if, at such other end of the body, the edges of the two side walls are maintained fixed and vertical and the edge of the bottom wall is maintained fixed and horizontal while only the top wall is free, then if the same shifting of the free edge of the top wall is resorted to, inclination of the horizontal edge of the bottom wall at the one edge of the body will be substantially doubled.

Considering now the structure involved in connection with a conventional open-ended rectangular tubular tapered combine feeder which, although the feeder as a whole is forwardly and downwardly inclined, may be said to have vertical side walls, a top wall and a bottom wall, all four walls providing a rigid structure not readily susceptible to distortion since the walls thereof are continuous in transverse cross-section so that there may be no relative displacement of the walls relative to one another. The open forward end of such a feeder communicates with the medial region of a transversely extending header or platform of a width considerably greater than that of the forward end of the feeder and the lower front edge of such platform usually carries a suitable crop cutting knife which is to be maintained level. The end regions of the platform overhang the side walls of the feeder and powered right and left auger sections disposed within the platform serve to conduct the crop which is encountered, as the combined progresses forwardly, inwardly toward the center where an infeed opening allows it to enter the front lower end of the feeder for conduction upwardly and rearwardly and into the threshing and separating instrumentalities associated with the combine. Because a conventional feeder has housing walls which are continuous in transverse cross section, the housing is relatively rigid and is not susceptible to distortion. However by slitting the feeder housing, in effect, in a longitudinal direction along the juncture line between the top wall and one of the vertical side walls so that the free edge of such top wall may be forcibly slid longitudinally along the upper edge of such vertical side wall, the aforementioned phenomena of rectangular tube will come into existence in connection with the structure involved so that a rearward sliding of the free edge of the top wall along the upper edge of the adjacent side wall will induce the aforementioned tension in one front vertical edge of the feeder housing and compression in the other front vertical edge thereof. The transversely disposed platform which is secured to the front open end of the feeder will consequently change its transverse inclination, as will the cutter knife assembly which is carried at the front edge of the bottom wall of the platform, this being the aim of the present invention.

According to the present invention, a reaction block is fixedly mounted on one side wall of the feeder near the upper edge of the latter and in the medial region thereof, while an adjustment screw slidingly projects through such block and has one end thereof fixedly anchored to the top wall so that selective manipulation of a pair of nuts on opposite sides of the block will force the free edge of the top wall in one direction or the other along the upper edge of the adjacent vertical side wall. For the reasons outlined above, such shifting of the top wall will place the feeder under compound distortion and, because the two vertical side walls of the feeder, as well as the bottom wall thereof, are fixed in position to the forward end of the combine, the previously described doubled magnitude of transverse feeder inclination will be effected for leveling purposes. An access door in the top wall of the feed housing affords access to the adjusting mechanism.

The provision of a leveling device for combine platforms such as has briefly been outlined above, constitutes the principal object of the present invention.

Other objects and advantages of the invention, not at this time enumerated, will readily suggest themselves as the nature of the invention is better understood.

In the accompanying two sheets of drawings forming a part of this specification, one illustrated embodiment of the invention has been shown.

Figure 2:
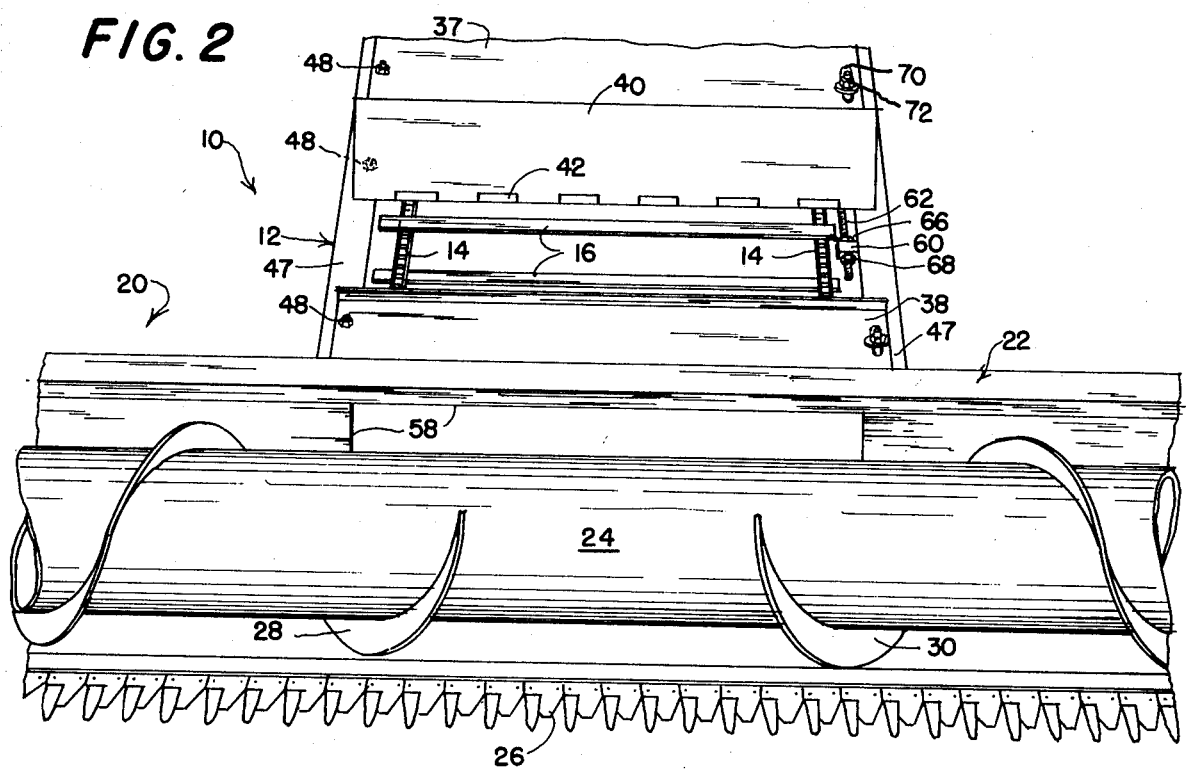
Figure 3:
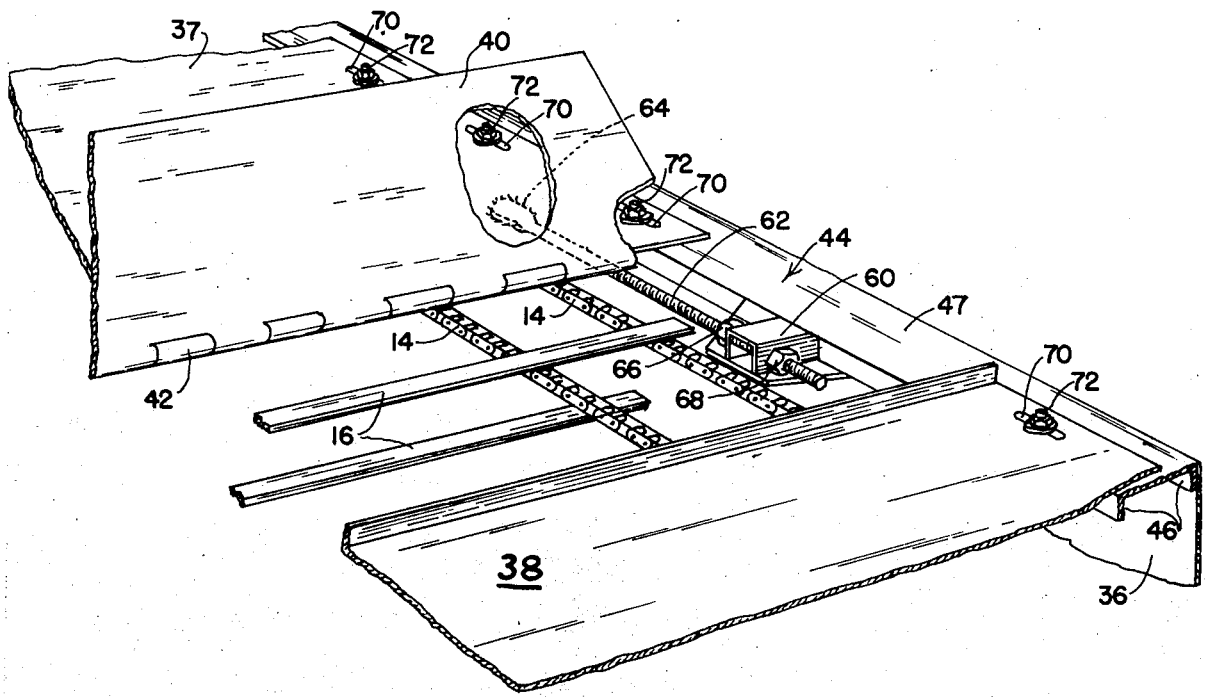

In these drawings:

FIG. 1 is a fragmentary front perspective view, largely schematic in its representation, of a combine feeder housing and its associated platform or header casing, the improved platform adjusting mechanism of the present invention being operatively applied to the feeder;

FIG. 2 is a more detailed fragmentary front elevational view of a combine platform and its associated feeder, such view showing the crop-cutting knife and auger within the platform confines, and also showing the crop elevator within the feeder; and FIG. 3 is an enlarged left perspective view looking down on the top wall of the feeder, the access door in such wall being shown in its open position so as to reveal the present adjustment mechanism.

Referring now to the drawings in detail, the invention is disclosed herein in association with a more or less conventional harvester combine feeder 10, only the forward portion of which is disclosed herein. The feeder is provided with a housing 12 within which there is disposed the ususal infeed elevator mechanism including endless chains 14 which cooperate with sprockets (not shown) at opposite ends of the feeder. The usual slats 16 extend across the chains. It will be understood that the rear end of the feeder is pivotally connected at an elevated region to the front end of the combine so that the feeder is capable of swinging movements about a horizontal axis. Normally, the feeder 10 is inclined forwardly and downwardly and the lower forward end thereof has secured thereto a header or platform 20 which extends transversely across such lower end and overhangs the same on either side thereof. A quick detachable connection between the feeder 10 and the platform 20, of the type disclosed in U.S. Pat. No. 3,270,489, issued Sept. 6, 1966 can be utilized. The platform 20 is provided with a casing 22 within which there is disposed the usual auger 24 and shearing knife 26, the auger being equipped with right and left hand flights 28 and 30 for gathering the crop which is severed by the knife 26 toward the central region of the platform for discharge rearwardly into the feeder 10.

The arrangement of parts briefly set forth above is purely conventional and no claim is made herein to any novelty associated with the same, the invention consisting rather in the novel construction of the feeder housing whereby forcible regulable distortion thereof in a manner that will be described in detail presently will effect commensurate side-to-side rocking movement of the platform 20 bodily as a whole, whereby adjustments for leveling purposes may be accomplished.

Referring now to FIG. 1 wherein the feeder housing 12 and platform casing or header 22 are disclosed in their associated relationship, the feeder housing is of elongated tubular design and is provided with a bottom wall 32, upstanding vertical side walls 34 and 36, and a two-part top wall consisting of front and rear sections 38 and 37 and which is interrupted by an access opening having a hinged access door 40 associated therewith, such door being connected to the rear wall section 37 by a pianotype hinge 42. The upper edge regions of the right and left hand side walls 34 and 36 have inverted channel members 44 secured thereto (see also FIG. 3), such members having downwardly extending flanges 46 and horizontal interconnecting webs 47. The top wall sections 37 and 38 are in the form of rectangular panels which are secured to the right hand channel member 44 by means of fastening bolts 48 or the like.

It is to be noted that the terms "right hand" and "left hand" as employed herein refer to the right and left side of the combine as viewed when looking forwardly from the rear thereof.

The platform casing 22 includes a bottom wall 50, right and left hand triangular side walls 52 and 54, and a rear wall 56. The aforementioned knife 26 extends along the forward edge of the bottom wall 50. A rectangular crop infeed opening 58 is provided in the rear wall 50 centrally thereof whereby the crop which is severed by the knife 26 and gathered to the central region of the platform 20 by the auger 24 is fed through the opening 58 and into the feeder 10.

The leveling mechanism of the present invention is predicated upon the fact that a small distortion of the walls of the feeder housing 12 in a particular manner that will be set forth in detail presently will effect rocking adjustment of the entire platform in either direction, depending of course upon the manner in which such distortion is effected.

Accordingly, and as best shown in FIG. 3, in order to distort the feeder housing 12 for leveling purposes, a reaction post 60 of channel-like construction is welded or otherwise fixedly secured to the side wall 36 and its connected channel 44. An elongated adjustment screw 62 projects loosely through the reaction post 60 and has its rear end secured as by welding to the underneath side of the top wall section or panel 37. Adjustment nuts 66 and 68 are threadedly received on the adjustment screw 62 and occupy positions on opposite sides of the reaction post 60. The free edge regions of the two top wall sections 37 and 38 are provided with elongateed slots 70 therethrough which cooperate with fastening stud and nut assemblies 72 mounted on the web portion 47 of the associated channel 44 so that, upon loosening such stud and nut assemblies, the free edges of the top wall sections 37 and 38 are capable of limited shifting movement relative to channel 44 in a longitudinal direction.

The aforementioned necessary distortion which is required to rock the platform 20 in one direction or the other for leveling purposes is attained according to the present invention by effecting shifting of the free edges of the top wall sections 37 and 38 of the feeder housing 10 along the upper edge of the side wall 36 while maintaining such edges in longitudinal register or coincidence. Shifting of such free edges of the wall sections 37 and 38 forwardly in this manner will cause the platform casing 22 to rock in a counterclockwise direction as viewed in FIGS. 1 and 2 as indicated by the dotted lines in FIG. 1, while shifting of the free edges rearwardly will cause the platform casing 22 to rock in a clockwise direction. It has been ascertained that the reason why a forward shifting of the free edges of the top wall sections 37 and 38 will effect counterclockwise rocking of the platform casing 22 is predicated upon the fact that this results in a distortion which places the forward substantially vertical edge of the wall 34 under compression. At the same time, the distortion is transmitted through the walls of the housing 12 in such a manner that the forward substantially vertical edge region of the wall 36 is placed under tension. With the front part of the wall 34 existing under compression and the front part of the wall 36 existing under tension, it is natural that the platform casing 22 which is secured to the forward open rim of the housing 12 will move to the position shown in dotted lines in FIG. 1. Although the geometrical principles involved in such distortion of the housing 12 are readily ascertainable, it is deemed sufficient for purposes of discussion herein to state that this distortion and the consequent inclination of the platform or header 20 is readily demonstratable in actual practice. It will be understood, of course, that longitudinal shifting movement of the free edge region of the top wall sections/panel 37 in a rearward direction along the left hand channel 44 will reverse the tension and compression in the side walls 36 and 34 respectively so that the movement of the feeder casing 20 will take place in a clockwise direction.

Leveling operations in actual practice are accomplished by initially raising the access door 40 and loosening the fastening stud and nut assemblies 72 so as to free both panels 37 and 38 for shifting movements. Thereafter if forward shifting of the free edge region the sections 37 and 38 is desired, the nut 66 may be loosened or backed off to a predetermined degree, after which the nut 68 may be tightened to place the adjustment screw 62 under tension and thus draw the free edge region of the panels 37 and 38 forwardly. If rearward shifting of the panels 37 and 38 is desired, the nut 68 will first be loosened and the nut 66 thereafter tightened. After the required leveling operation has been accomplished, the clamping stud and nut assemblies 72 will be tightened to lock the housing 12 in its distorted condition. It should be noted that shifting movement is transmitted from section 37 to section 38 through right hand channel 44 to which both sections are secured by bolts 48.

The invention is not to be limited to the exact arrangement of parts shown in the accompanying drawings or described in this specification as various changes in the details of construction may be resorted to without departing from the spirit of the invention. For example, although the invention has been shown and described in connection with the leveling of a combine feeder platform or header, the principles of the invention are equally applicable to the leveling of a corn head or the like or, in fact, any crop treating device which may be associated with the feeder. Additionally, although the leveling instrumentalities including the adjustment screw 62 and nuts 66 and 68 are shown and described as being associated with the feeder side wall 36, it is contemplated that such instrumentalities may be applied to the right hand side wall 34 if desired, in which case the top wall sections 37 and 38 would have their proximate edges fixed to the side wall 36 and their free edge regions slidable on the right hand channel 44. Therefore, only insofar as the invention has been particularly pointed out in the accompanying claims is the same to be limited.

What is claimed is:

1. In an agricultural implement, the combination with a feeder having a generally rectilinear tubular housing provided with a rectangular forward open rim, said housing including a transverse bottom wall, upstanding side walls, and a transverse top wall having a proximate edge fixedly secured to the upper edge of one of said side walls and a free distal edge disposed in longitudinal register with the upper edge of the other side wall, and a crop-gathering header including a bottom wall and an upstanding rear wall which extends across said open rim and is secured thereto, cooperating means on the free distal edge region of said top wall and the adjacent side wall for regulably shifting such region longitudinally along the upper edge of such side wall in either direction to thereby distort the forward rim region of the housing and effect relative vertical shifting movement of forward edge regions of the side walls and consequent rocking movement of the header casing bodily as a unit.

2. In an agricultural implement, the combination set forth in claim 1, including additionally, releasable means for clamping said free distal edge region of the top wall to the adjacent side wall to lock such edge region in an adjusted position.

3. In an agricultural implement, the combination set forth in claim 1, wherein said top wall of the feeder housing is provided with an access opening which is closed by means of a hinged access door, and said cooperating shifting means is disposed interiorly of the feeder housing and is accessible for manipulation through said access opening when the door is in its open position.

4. In an agricultural implement, the combination set forth in claim 3, wherein said cooperating shifting means embodies cooperating threaded members one of which is effective against the free edge region of the top wall of the feeder and the other of which is effective against the adjacent side wall.

5. In an agricultural implement, the combination set forth in claim 3, wherein said cooperating shifting means comprises an elongated adjustment screw having one end thereof fixedly secured to the underneath side of said top wall, said adjustment screw projecting at least partially across said access opening, and a reaction member fixedly secured to said adjacent side wall and through which the adjustment screw loosely projects, and an adjusting nut threadly received on said adjustment screw on each side of the reaction post.

6. In an agricultural implement, the combination set forth in claim 5, wherein said adjustment screw is secured to the underneath side of the top wall of the feeder housing rearwardly of said access opening and projects forwardly across said access opening.

7. In an agricultural implement, the combination set forth in claim 5, wherein said means for releasably clamping the free distal edge region of the top wall of the housing to the adjacent side wall comprises a series of longitudinally spaced elongated slots formed in the distal free edge region of the top wall, and a plurality of stud and nut assemblies, one for each slot, mounted on the upper edge region of the adjacent side wall of the feeder housing.

8. In an agricultural implement, the combination set forth in claim 7, wherein the top wall of the feeder housing includes forward and rearward rectangular panels which are spaced apart in the longitudinal direction of the feeder housing and establish said access opening therebetween, the access door is hinged to the forward edge of the rearward panel, the adjustment screw is fixedly secured to the rearward panel, and the proximate edge regions of both panels are fixedly secured to the adjacent side wall by fastening bolts.

* * * * *